United States Patent Office.

KARL ELBEL AND IGNAZ ROSENBERG, OF BIEBRICH, GERMANY, ASSIGNORS TO KALLE & CO., OF SAME PLACE.

PRIMARY DISAZO BLUE-BLACK DYE.

SPECIFICATION forming part of Letters Patent No. 613,639, dated November 1, 1898.

Application filed December 27, 1897. Serial No. 663,472. (Specimens.)

*To all whom it may concern:*

Be it known that we, KARL ELBEL, a subject of the King of Prussia, Emperor of Germany, and IGNAZ ROSENBERG, a subject of the Emperor of Austria-Hungary, doctors of philosophy, residing at Biebrich-on-the-Rhine, Germany, and assignors to KALLE & CO., of same place, have invented certain new and useful Improvements in the Manufacture of a Blue-Black Disazo Coloring-Matter, of which the following is a specification, and which has been patented in England, No. 515, January 9, 1894.

This invention relates to the preparation of a new very valuable primary disazo coloring-matter dyeing wool a blue black from the 1.8.4.6 amidonaphtholdisulfo-acid (K) according to the new method described by us in a patent specification bearing the same date for the preparation of a "Blue-black primary disazo coloring-matter."

We describe the method of preparing this dyestuff by giving the following example: 36.2 kilos neutral sodium salt of the amidonaphtholdisulfo-acid (K) are dissolved in one thousand liters of water and acidified with fifteen kilos concentrated hydrochloric acid. Into this mixture, after cooling it down to about 5° centigrade, a diazo solution is run, which is obtained in the usual manner from 13.8 kilos paranitranilin, twenty-eight kilos concentrated hydrochloric acid, 6.9 kilos sodium nitrite, one thousand liters of water, and the needful quantity of ice. After several hours' stirring the formation of the monoazo color is completed. The combination liquid is then cooled and a diazo solution is poured into it, obtained in the usual manner from 9.3 kilos anilin, two hundred liters of water, two hundred and fifty kilos of ice, twenty-eight kilos hydrochloric acid, and 6.9 kilos sodium nitrite. The formation of the new disazo coloring-matter commences immediately, and it can be hastened by adding sodium acetate, so that it is finished after a short while. The liquid is then heated up slowly and kept at a temperature of 30° centigrade for several hours. The temperature is then raised to the boil and the dyestuff precipitated by adding common salt, filtered, pressed, and dried.

The new dyestuff forms a brown crystalline powder of bronzy luster which dissolves easily in water, difficultly in alcohol, with a deep pure-blue color.

In concentrated sulfuric acid the new dyestuff dissolves, giving a green solution which turns blue on addition of water.

The concentrated aqueous solution is precipitated by concentrated hydrochloric acid.

The new coloring-matter dyes wool from an acid-bath very fine shades of great fastness, ranging from blue to deep-blue black, according to the quantity of dyestuff employed.

What we claim is—

1. The process of making a primary disazo coloring-matter from the 1.8.4.6 amidonaphtholdisulfo-acid (K) by combining the said acid first with one molecule of paranitrodiazobenzene in presence of free mineral acid and then acting upon the so-formed monoazo color with one molecule of diazo-benzene in an acid combination liquid.

2. The new dyestuff hereinbefore described, which is obtainable by combining one molecule of 1.8.4.6 amidonaphtholdisulfo-acid (K) first with one molecule of paranitrodiazo-benzene and then with one molecule of diazo-benzene in an acid reaction liquid, and which consists of a brown crystalline powder of bronzy luster easily soluble in water, difficultly soluble in alcohol with pure-blue coloration, soluble in concentrated sulfuric acid with green color, the aqueous solution of which is precipitated by hydrochloric acid, the sulfuric-acid solution of which turns pure blue on addition of water and which dyes wool from an acid-bath blue to deep blue-black shades.

In testimony whereof we have signed our names to this specification in the presence of two subscribing witnesses.

KARL ELBEL.
IGNAZ ROSENBERG.

Witnesses:
C. REINHARD,
JACOB ADRIAN.